Figure 1:
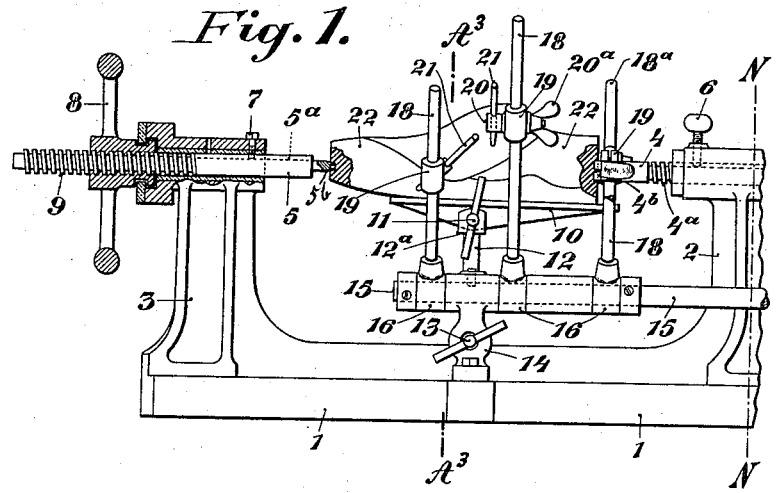

N. & E. WINKLE.
CENTERING GAGE FOR COPYING LATHES.
APPLICATION FILED FEB. 6, 1912.

1,033,648.

Patented July 23, 1912.

Witnesses:
Edward P. White

Inventors
Norbert Winkle
Eugen Winkle
by
James P. Norris
Atty

COLUMBIA PLANOGRAPH CO., WASHINGTON, D. C.

UNITED STATES PATENT OFFICE.

NORBERT WINKLE AND EUGEN WINKLE, OF ALTENSTADT, GERMANY.

CENTERING-GAGE FOR COPYING-LATHES.

1,033,648.

Specification of Letters Patent. Patented July 23, 1912.

Application filed February 6, 1912. Serial No. 675,901.

*To all whom it may concern:*

Be it known that we, NORBERT WINKLE and EUGEN WINKLE, subjects of the King of Bavaria, residing at Altenstadt-on-the-Iller, Kingdom of Bavaria, Germany, have invented certain new and useful Improvements in Centering-Gages for Copying-Lathes, of which the following is a specification.

The turning of objects having irregular surfaces, such as shoe-lasts, butt-ends of guns, and other similar objects, is effected on the so-called "copying-lathe" from a finished model. For this purpose it is necessary that the roughly prepared object to be worked be properly mounted in the centering devices of the lathe so that the turning out of faulty pieces may be avoided, and further to save time and material, so that the object being worked can be used roughly prepared with a much smaller allowance of material to be turned off to bring it to the desired shape. Hitherto this rather difficult mounting of the object to be operated upon was effected by skilled men by the eye alone, whereby on the one hand the skill of the workmen had to be relied upon, and on the other hand, the production of defective objects were unavoidable, unless the roughly prepared object was of considerably larger dimensions than those of the finished object. This inconvenience is remedied by centering the object beforehand by means of the apparatus hereafter described and whereby the centering of the object in the copying-lathe is transformed into a simple mechanical action which requires no special training, and which can be carried out by any workman.

Figure 2:
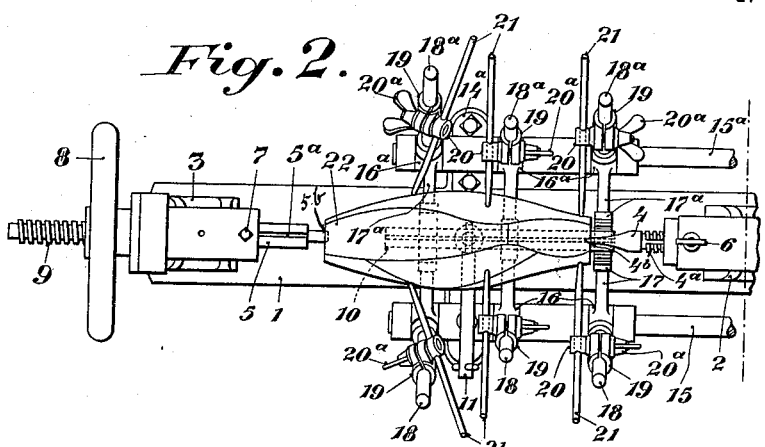
Figure 3:
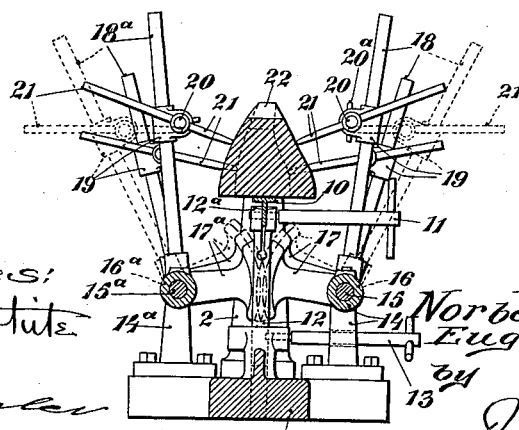

An example of the invention is shown in the drawing in which:

Figure 1 shows a side-view of the apparatus, partly in section, Fig. 2 is a top-view, Fig. 3 a section on line A³—A³ of Fig. 1.

In the drawing 1 indicates a base plate upon which are two standards 2 and 3 which hold the adjustable centering rods 4 and 5. The rod 4 is adjustable by means of the thread 4ᵃ to suit the length of the object 22 and can be retained in fixed position after adjustment by means of a screw 6. The end 4ᵇ of the rod 4, as well as the point 5ᵇ of the rod 5 must correspond to the mounting pins of the copying lathe. The rod 5 is arranged in the head of the standard 3 in such a way as to be movable in a longitudinal direction; it is prevented from turning by a screw 7 engaging a groove 5ᵃ in its body, and said rod can be moved longitudinally by means of the hand-wheel 8 and the thread 9. Between and underneath the rods 4 and 5 is a bracket 10 adjustable by the screw 11 and which bracket can be held fast by means of this screw when adjusted. The screw 11 passes through the split head 12ᵃ of a support 12 which is movable in a vertical direction and can be secured by means of a screw 13. By this arrangement the bracket 10 may be adjusted vertically as well as around the screw 11. On opposite sides of the frame 1, frames 14 and 14ᵃ are arranged which respectively support horizontal shafts 15 and 15ᵃ. On these horizontal shafts, toothed gear segments 17 and 17ᵃ are secured by means of the bosses 16 and 16ᵃ; those of the segments which are opposite one another mesh and therefore can simultaneously be rocked about the shafts 15 and 15ᵃ. The bosses 16 and 16ᵃ have sockets in which the arms 18 and 18ᵃ are arranged. To the latter the caliper pins 21 are attached by means of clamping sleeves 19 fastened by screws 20. The caliper pins 21 penetrate the heads of the screws 20 so that by screwing up the nuts 20ᵃ both the sleeves 19 and the caliper pins 21 are fastened in place. Owing to this fastening arrangement, the caliper pins 21 may be adjusted and moved in any direction.

The method of working this arrangement is as follows:—A finished object, that is to say a model, is mounted between the centering rods 4 and 5. Thereupon the caliper pins 21 are placed at those points of the model which show the largest projection. The bracket 10 is adjusted underneath the surface of the model, leaving some space between. Then the caliper pins 21 are removed from the model by tilting the arms 18 and 18ᵃ about the shafts 15 and 15ᵃ, whereby owing to the intermediate arrangement of the toothed gear segments 17 and 17ᵃ, the opposite caliper pins are removed from the model simultaneously and at equal distance. After having removed the model from the machine, the roughly prepared object 22 is put on the support 10 and the caliper pins 21 set to the object 22 being worked, whereby the latter is brought into such a position as to entirely comprise the space of the previously mounted model, and consequently lies in a central position with regard to the same. The rod 5 is now screwed up by means of the hand wheel 8, whereby the point 5$^b$ of said rod 5 as well as the edge 4$^b$ of the rod 4 are pressed into the object, so that the latter can now be fixed in the working machine and the marked points suitably made use of.

It is obvious that the centering and marking of the mounting points is effected quickly and in the simplest way by means of the described arrangement, and the turning out of faulty objects is avoided; the object being worked can be shaped very close to the final shape of the finished object so that a proportionately small re-working by the working machine is required.

What we claim is:—

1. In a centering gage for copying lathes, the combination, with work-supporting means; of a pair of rock shafts disposed parallel with and upon opposite sides of the work; pairs of opposed caliper pins connected to said shafts; and connections between said shafts for causing the latter to rock synchronously in opposite directions through equal arcs and move said pins toward or from each other to an equal extent into or out of engagement with the work.

2. In a centering gage for copying lathes, the combination, with work-supporting means; of a pair of horizontal rock shafts disposed parallel with and upon opposite sides of the work; pairs of opposed caliper pins connected to said shafts; and intermeshing gear sectors connecting said shafts for causing the latter to rock synchronously in opposite directions through equal arcs and move said pins toward or from each other to an equal extent into or out of engagement with the work.

3. In a centering gage for copying lathes, the combination, with a base, a pair of standards mounted upon the ends thereof and provided with centering devices adapted to engage the ends of the work, and a work-supporting bracket mounted upon said plate between said standards; of a pair of parallel rock shafts disposed upon opposite sides of said bracket; pairs of opposed caliper pins connected to said shafts; and connections between said shafts for causing the latter to rock synchronously in opposite directions through equal arcs and move said pins toward or from each other to an equal extent into or out of engagement with the sides of the work.

In testimony whereof we have hereunto set our hands in presence of two subscribing witnesses.

NORBERT WINKLE.
EUGEN WINKLE.

Witnesses:
A. V. W. COXE,
RICHARD LEMP.